(12) United States Patent
Hoyle et al.

(10) Patent No.: US 10,422,941 B2
(45) Date of Patent: Sep. 24, 2019

(54) OPTICAL FILM INCLUDING COLLIMATING REFLECTIVE POLARIZER AND STRUCTURED LAYER

(71) Applicant: 3M INNOVATIVE PROPERTIES COMPANY, St. Paul, MN (US)

(72) Inventors: Charles D. Hoyle, Stillwater, MN (US); Gilles J. Benoit, Minneapolis, MN (US); Timothy J. Nevitt, Red Wing, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 87 days.

(21) Appl. No.: 15/544,654

(22) PCT Filed: Feb. 16, 2016

(86) PCT No.: PCT/US2016/018018
§ 371 (c)(1),
(2) Date: Jul. 19, 2017

(87) PCT Pub. No.: WO2016/137777
PCT Pub. Date: Sep. 1, 2016

(65) Prior Publication Data
US 2018/0039011 A1    Feb. 8, 2018

Related U.S. Application Data

(60) Provisional application No. 62/121,569, filed on Feb. 27, 2015.

(51) Int. Cl.
*G02B 5/30* (2006.01)
*F21V 8/00* (2006.01)
*G02B 5/18* (2006.01)

(52) U.S. Cl.
CPC ......... *G02B 6/0056* (2013.01); *G02B 5/1861* (2013.01); *G02B 5/30* (2013.01);
(Continued)

(58) Field of Classification Search
CPC ...... G02B 6/0056; G02B 5/1861; G02B 5/30; G02B 5/3066; G02B 6/0053;
(Continued)

(56) References Cited

U.S. PATENT DOCUMENTS 3,610,729 A   10/1971 Rogers
4,446,305 A    5/1984 Rogers
(Continued)

FOREIGN PATENT DOCUMENTS

KR    10-2006-0029461    4/2006
WO    WO 1995-17303      6/1995
(Continued)

OTHER PUBLICATIONS

Macleod, "Thin-Film Optical Filters", Second Edition, Institute of Physics Publishing Bristol and Philadelphia, 1986, pp. 1-667.
(Continued)

*Primary Examiner* — Bao Q Truong
(74) *Attorney, Agent, or Firm* — Clifton F. Richardson

(57) ABSTRACT

An optical film including a collimating reflective polarizer and a structured layer disposed on a major surface of the collimating reflective polarizer. The structured layer includes a plurality of three-dimensional structures on an outer major surface of the structured layer facing away from the collimating reflective polarizer. The three-dimensional structures have a surface normal having an angle relative to a plane of the optical film that is in a range of about 35 degrees to about 55 degrees over at least 50 percent of a surface area of the three-dimensional structures.

19 Claims, 6 Drawing Sheets

(52) U.S. Cl.
CPC ......... *G02B 5/3066* (2013.01); *G02B 6/0053* (2013.01); *G02B 6/0055* (2013.01)

(58) Field of Classification Search
CPC .... G02B 6/0055; G02B 6/0033; G02B 6/005; G02B 5/3025; F21V 5/005; G02F 1/133606; G02F 2001/133607; G02F 1/133615
See application file for complete search history.

(56) References Cited

U.S. PATENT DOCUMENTS

| | | |
|---|---|---|
| 4,540,623 A | 9/1985 | Im |
| 5,103,337 A | 4/1992 | Schrenk |
| 5,175,030 A | 12/1992 | Lu |
| 5,183,597 A | 2/1993 | Lu |
| 5,360,659 A | 11/1994 | Arends |
| 5,448,404 A | 9/1995 | Schrenk |
| 5,882,774 A | 3/1999 | Jonza |
| 6,157,490 A | 12/2000 | Wheatley |
| 6,368,699 B1 | 4/2002 | Gilbert |
| 6,531,230 B1 | 3/2003 | Weber |
| 6,783,349 B2 | 8/2004 | Neavin |
| 7,433,002 B2 | 10/2008 | Kim |
| 2003/0160917 A1 | 8/2003 | Takahashi |
| 2007/0279554 A1 | 12/2007 | Kowarz |
| 2009/0161385 A1* | 6/2009 | Parker ................. F21V 5/00 362/618 |
| 2010/0309551 A1 | 12/2010 | Whitney |
| 2011/0272849 A1 | 11/2011 | Neavin |
| 2012/0275023 A1 | 11/2012 | Weber |
| 2012/0320311 A1* | 12/2012 | Gotou ............... G02B 5/0231 349/65 |
| 2014/0254125 A1 | 9/2014 | Nevitt |
| 2014/0340930 A1 | 11/2014 | Nakagome |
| 2014/0375929 A1* | 12/2014 | Boyd ............. G02F 1/133526 349/65 |
| 2015/0301384 A1* | 10/2015 | Koike ................ G02F 1/1336 349/65 |
| 2016/0131898 A1* | 5/2016 | Chen ............... G02B 27/0172 349/11 |

FOREIGN PATENT DOCUMENTS

| | | |
|---|---|---|
| WO | WO 1999-39224 | 8/1995 |
| WO | WO 2013-059225 | 4/2013 |

OTHER PUBLICATIONS

Weber, "Giant Birefringent Optics in Multilayer Polymer Mirrors", Science, 2000, vol. 287, pp. 2451-2456.
International Search Report for PCT International Application No. PCT/US2016/018018, dated Jun. 8, 2016, 3 pages.

* cited by examiner

OPTICAL FILM INCLUDING COLLIMATING REFLECTIVE POLARIZER AND STRUCTURED LAYER

BACKGROUND

Reflective polarizers substantially transmit light having one polarization state while substantially reflecting light having an orthogonal polarization state and are used in backlights for display devices. In some cases, reflective polarizers are coupled with other reflective surfaces to create a light recycling cavity. Microreplicated films having a plurality of light directing elements may be used to change the angular distribution of light.

SUMMARY

According to some aspects of the present description, an optical film including a collimating reflective polarizer and a structured layer disposed on a major surface of the collimating reflective polarizer is provided. The structured layer includes a plurality of three-dimensional structures on an outer major surface of the structured layer facing away from the collimating reflective polarizer. The three-dimensional structures have a surface normal having an angle relative to a plane of the optical film that is in a range of about 35 degrees to about 55 degrees over at least 50 percent of a surface area of the three-dimensional structures.

According to some aspects of the present description, backlight systems and displays including the optical film are provided.

DETAILED DESCRIPTION

Figure 1:
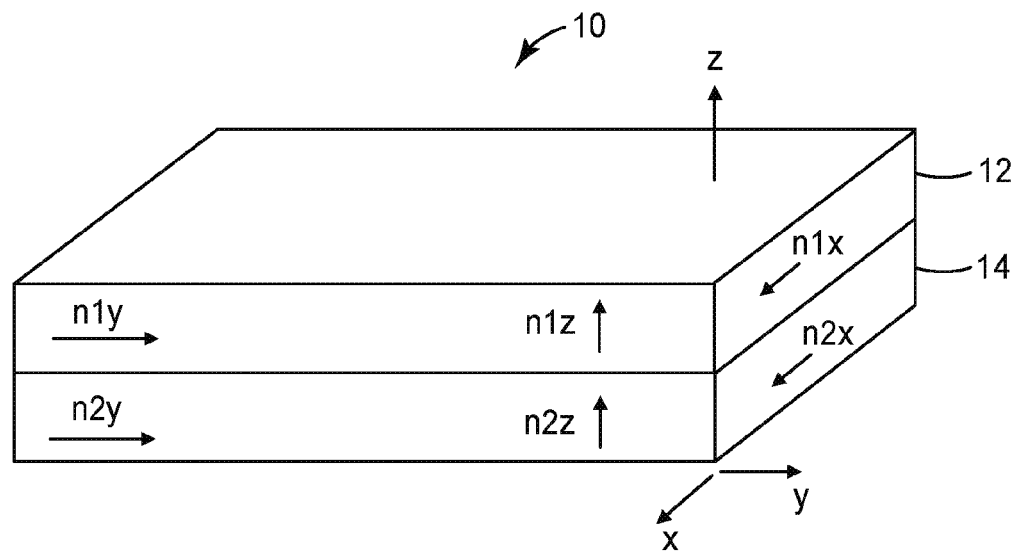
FIG. 1 is a schematic perspective view of an optical repeat unit of a multilayer optical film.

In the following description, reference is made to the accompanying drawings that forms a part hereof and in which are shown by way of illustration. The drawings are not necessarily to scale. It is to be understood that other embodiments are contemplated and may be made without departing from the scope or spirit of the present disclosure.

Reflective polarizers are often used in visual display systems such as liquid crystal displays. These systems—now found in a wide variety of electronic devices such as mobile phones, computers including tablets, notebooks, and subnotebooks, and some flat panel TVs—use a liquid crystal (LC) panel illuminated from behind with an extended area backlight. The reflective polarizer is placed over or otherwise incorporated into the backlight to transmit light of a polarization state useable by the LC panel from the backlight to the LC panel. Light of an orthogonal polarization state, which is not useable by the LC panel, is reflected back into the backlight, where it can eventually be reflected back towards the LC panel and at least partially converted to the useable polarization state, thus "recycling" light that would normally be lost, and increasing the resulting brightness and overall efficiency of the display.

Collimating reflective polarizers can partially collimate by reflecting high angle light (i.e., light incident on the collimating reflective polarizer at a high incidence angle) and transmitting low angle light (i.e., light incident on the collimating reflective polarizer at a low incidence angle). The high angle light is recycled so that it can eventually be scattered into the transmission cone of the collimating reflective polarizer.

Collimating reflective polarizers can increase the axial luminance of a display, but ordinary reflective polarizers in combination with brightness enhancement films (BEFs) that include extended linear prisms typically produce a higher on-axis luminance than collimating reflective polarizers that do not include refractive elements. In typical backlights, two layers of BEFs with linear prisms extending in orthogonal directions are used with a reflective polarizer. According to the present description, it has been discovered that a single layer having refractive structures having certain three-dimensional geometries can be combined with a collimating reflective polarizer to produce an axial luminance similar to that produced using a conventional reflective polarizer and two BEF films. Furthermore, it has been discovered that the structured layer can be formed directly on a collimating reflective polarizer resulting in a single optical film that is as effective as or more effective than conventional three film stacks of a reflective polarizer and two crossed BEF films. In addition, a drawback of conventional BEF films is that the edges of the linear prisms can scratch or otherwise damage other components in the display. In some embodiments of the present description, the structures in the structured layers have an inverted geometry with a valley instead of an edge or a peak and such geometries can minimize damage to other components included in a display.

Collimating reflective polarizers can be made from multilayer optical films, i.e., films that provide desirable transmission and/or reflection properties at least partially by an arrangement of microlayers of differing refractive index. It has been known to make such multilayer optical films by depositing a sequence of inorganic materials in optically thin layers ("microlayers") on a substrate in a vacuum chamber. Inorganic multilayer optical films are described, for example, in textbooks by H. A. Macleod, *Thin-Film Optical Filters*, 2nd Ed., Macmillan Publishing Co. (1986) and by A. Thelan, *Design of Optical Interference Filters*, McGraw-Hill, Inc. (1989).

Multilayer optical films have also been demonstrated by coextrusion of alternating polymer layers. See, e.g., U.S. Pat. No. 3,610,729 (Rogers), U.S. Pat. No. 4,446,305 (Rogers et al.), U.S. Pat. No. 4,540,623 (Im et al.), U.S. Pat. No. 5,448,404 (Schrenk et al.), and U.S. Pat. No. 5,882,774 (Jonza et al.). In these polymeric multilayer optical films, polymer materials are used predominantly or exclusively in the makeup of the individual layers. Such films are compatible with high volume manufacturing processes and can be made in large sheets and roll goods.

A multilayer optical film includes individual microlayers having different refractive index characteristics so that some light is reflected at interfaces between adjacent microlayers. The microlayers are sufficiently thin so that light reflected at a plurality of the interfaces undergoes constructive or destructive interference in order to give the multilayer optical film the desired reflective or transmissive properties. For multilayer optical films designed to reflect light at ultraviolet, visible, or near-infrared wavelengths, each microlayer generally has an optical thickness (a physical thickness multiplied by a refractive index) of less than about 1 μm. Thicker layers may be included, such as skin layers at the outer surfaces of the multilayer optical film, or protective boundary layers (PBLs) disposed within the multilayer optical films, that separate coherent groupings (referred to herein as "packets") of microlayers.

For polarizing applications, e.g., for reflective polarizers, at least some of the optical layers are formed using birefringent polymers, in which the polymer's index of refraction has differing values along orthogonal Cartesian axes of the polymer. Generally, birefringent polymer microlayers have their orthogonal Cartesian axes defined by the normal to the layer plane (z-axis), with the x-axis and y-axis lying within the layer plane. Birefringent polymers can also be used in non-polarizing applications.

Referring now to FIG. 1, a schematic perspective view of an exemplary optical repeat unit (ORU) of a multilayer optical film is illustrated. FIG. 1 depicts only two layers of a multilayer optical film 10, which can include tens or hundreds of such layers arranged in one or more contiguous packets or stacks. The film 10 includes individual microlayers 12, 14, where "microlayers" refer to layers that are sufficiently thin so that light reflected at a plurality of interfaces between such layers undergoes constructive or destructive interference to give the multilayer optical film the desired reflective or transmissive properties. The microlayers 12, 14 can together represent one optical repeat unit (ORU) of the multilayer stack, an ORU being the smallest set of layers that recur in a repeating pattern throughout the thickness of the stack. The microlayers have different refractive index characteristics so that some light is reflected at interfaces between adjacent microlayers. For optical films designed to reflect light at ultraviolet, visible, or near-infrared wavelengths, each microlayer typically has an optical thickness (i.e., a physical thickness multiplied by refractive index) of less than about 1 micrometer.

In some cases, the microlayers 12, 14 have thicknesses and refractive index values corresponding to a ¼-wave stack, i.e., arranged in optical repeat units or unit cells each having two adjacent microlayers of equal optical thickness (f-ratio=50%), such optical repeat unit being effective to reflect by constructive interference light whose wavelength λ is twice the overall optical thickness of the optical repeat unit. Other layer arrangements, such as multilayer optical films having 2-microlayer optical repeat units whose f-ratio is different from 50%, or films whose optical repeat units include more than two microlayers, are also known. These optical repeat unit designs can be configured to reduce or to increase certain higher-order reflections. See, e.g., U.S. Pat. No. 5,360,659 (Arends et al.) and U.S. Pat. No. 5,103,337 (Schrenk et al.). Thickness gradients along a thickness axis of the film (e.g., the z-axis) can be used to provide a widened reflection band, such as a reflection band that extends over the entire human visible region and into the near infrared so that as the band shifts to shorter wavelengths at oblique incidence angles the microlayer stack continues to reflect over the entire visible spectrum. Thickness gradients tailored to sharpen band edges, i.e., the wavelength transition between high reflection and high transmission, are discussed in U.S. Pat. No. 6,157,490 (Wheatley et al.).

Further details of multilayer optical films and related designs and constructions are discussed in U.S. Pat. No. 5,882,774 (Jonza et al.) and U.S. Pat. No. 6,531,230 (Weber et al.), PCT Publications WO 95/17303 (Ouderkirk et al.) and WO 99/39224 (Ouderkirk et al.), and the publication entitled "Giant Birefringent Optics in Multilayer Polymer Mirrors", Science, Vol. 287, March 2000 (Weber et al.). The multilayer optical films and related articles can include additional layers and coatings selected for their optical, mechanical, and/or chemical properties. For example, a UV absorbing layer can be added at the incident side of the film to protect components from degradation caused by UV light. The multilayer optical films can be attached to mechanically reinforcing layers using a UV-curable acrylate adhesive or other suitable material. Such reinforcing layers may comprise polymers such as PET or polycarbonate, and may also include structured surfaces that provide optical function such as light diffusion or collimation, e.g. by the use of beads or prisms. Additional layers and coatings can also include scratch resistant layers, tear resistant layers, and stiffening agents. See, e.g., U.S. Pat. No. 6,368,699 (Gilbert et al.). Methods and devices for making multilayer optical films are discussed in U.S. Pat. No. 6,783,349 (Neavin et al.).

The reflective and transmissive properties of multilayer optical film are a function of the refractive indices of the respective microlayers and the thicknesses and thickness distribution of the microlayers. Each microlayer can be characterized at least in localized positions in the film by in-plane refractive indices $n_x$, $n_y$, and a refractive index $n_z$ associated with a thickness axis of the film. These indices represent the refractive index of the subject material for light polarized along mutually orthogonal x-, y-, and z-axes, respectively. For ease of explanation in the present description, unless otherwise specified, the x-, y-, and z-axes are assumed to be local Cartesian coordinates applicable to any point of interest on a multilayer optical film, in which the microlayers extend parallel to the x-y plane, and wherein the x-axis is oriented within the plane of the film to maximize the magnitude of $\Delta n_x$. Hence, the magnitude of $\Delta n_y$ can be equal to or less than—but not greater than—the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n_j = n_{1j} - n_{2j}$, where j=x, y, or z and where the layer designations 1,2 are chosen so that $n_{1x} \geq n_{2x}$, i.e., $\Delta n_x \geq 0$.

In practice, the refractive indices are controlled by judicious materials selection and processing conditions. A multilayer film is made by co-extrusion of a large number, e.g. tens or hundreds of layers of two alternating polymers A, B, sometimes followed by passing the multilayer extrudate through one or more multiplication devices, then through a film die, and then stretching or otherwise orienting the extrudate to form a final film. The resulting film is typically composed of many hundreds of individual microlayers whose thicknesses and refractive indices are tailored to provide one or more reflection bands in desired region(s) of the spectrum, such as in the visible or near infrared. To achieve high reflectivities with a reasonable number of layers, adjacent microlayers typically exhibit a difference in refractive index ($\Delta n_x$) for light polarized along the x-axis of at least 0.05. In some embodiments, materials are selected such that the difference in refractive index for light polarized along the x-axis is as high as possible after orientation. If the high reflectivity is desired for two orthogonal polarizations, then the adjacent microlayers also can be made to exhibit a difference in refractive index ($\Delta n_y$) for light polarized along the y-axis of at least 0.05.

The '774 (Jonza et al.) patent referenced above describes, among other things, how the refractive index difference ($\Delta n_z$) between adjacent microlayers for light polarized along the z-axis can be tailored to achieve desirable reflectivity properties for the p-polarization component of obliquely incident light. To maintain high reflectivity of p-polarized light at oblique angles of incidence, the z-index mismatch $\Delta n_z$ between microlayers can be controlled to be substantially less than the maximum in-plane refractive index difference $\Delta n_x$, such that $\Delta n_z \leq 0.5 * \Delta n_x$, or $\Delta n_z \leq 0.25 * \Delta n_x$. A zero or near zero magnitude z-index mismatch yields interfaces between microlayers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e. $\Delta n_z < 0$. This condition yields interfaces whose reflectivity for p-polarized light increases with increasing angles of incidence, as is the case for s-polarized light.

The '774 (Jonza et al.) patent also discusses certain design considerations relating to multilayer optical films configured as polarizers, referred to as multilayer reflecting or reflective polarizers. In many applications, the ideal reflecting polarizer has high reflectance along one axis (the "extinction" or "block" axis) and zero reflectance along the other axis (the "transmission" or "pass" axis). For the purposes of the present description, light whose polarization state is substantially aligned with the pass axis or transmission axis is referred to as pass light and light whose polarization state is substantially aligned with the block axis or extinction axis is referred to as block light. Unless otherwise indicated, pass light at 60° incidence is measured using p-polarized pass light. If some reflectivity occurs along the transmission axis, the efficiency of the polarizer at off-normal angles may be reduced, and if the reflectivity is different for various wavelengths, color may be introduced into the transmitted light. Furthermore, exact matching of the two y indices and the two z indices may not be possible in some multilayer systems, and if the z-axis indices are not matched, introduction of a slight mismatch may be desired for in-plane indices n1y and n2y. In particular, by arranging the y-index mismatch to have the same sign as the z-index mismatch, a Brewster effect is produced at the interfaces of the microlayers, to minimize off-axis reflectivity, and therefore off-axis color, along the transmission axis of the multilayer reflecting polarizer.

Another design consideration discussed in '774 (Jonza et al.) relates to surface reflections at the air interfaces of the multilayer reflecting polarizer. Unless the polarizer is laminated on both sides to an existing glass component or to another existing film with clear optical adhesive, such surface reflections will reduce the transmission of light of the desired polarization in the optical system. Thus, in some cases it may be useful to add an antireflection (AR) coating to the reflecting polarizer.

For multilayer collimating reflective polarizers, the layer thicknesses and indices of refraction may be selected to provide better transmission of on-axis incident light versus obliquely incident light. Combined with a back reflector, collimating reflective polarizers may recycle obliquely incident light. On subsequent passes, recycled light may be more likely to be transmitted on-axis, resulting in a collimating effect. As described, for example, in PCT Publication WO 2013/059225 A1 (Weber et al.), a useful indication of the potential degree of collimation of light from a recycling backlight using such films may be obtained from the ratio of transmitted p-pol light at normal incidence (Tpassnormal) and 60 degrees incidence (Tpass60) of a given film. Useful collimating reflective polarizers may have ratios of Tpass60 to Tpassnormal of less than 0.75, 0.6, 0.5 or lower. In some embodiments, a ratio of Tpass60 to Tpassnormal is in a range of 0.1 to 0.75, for example.

Figure 2:
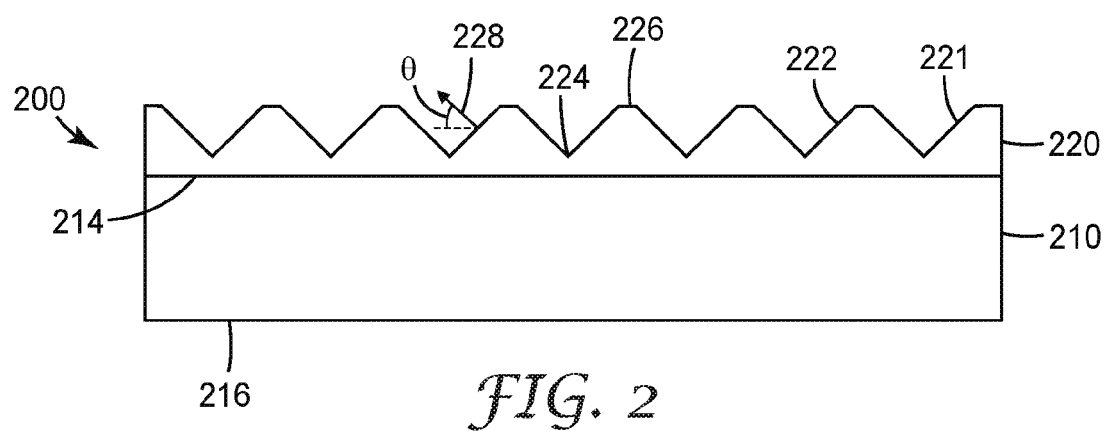
FIG. 2 is a cross-sectional view of an optical film.

FIG. 2 is a cross-sectional view of an optical film including a collimating reflective polarizer. Optical film 200 includes collimating reflective polarizer 210, which has opposing first and second major surfaces 214 and 216, and structured layer 220 which is disposed on first major surface 214 and which has outer major surface 221 that includes three dimensional structures 222 having valleys 224 and ridges 226. The ridges 226 are opposite the valleys 224 from the collimating reflective polarizer 210. The outer major surface 221 of structured layer 220 faces away from collimating reflective polarizer 210 and is structured so that the three-dimensional structures 222 face away from the collimating reflective polarizer 210. Three-dimensional structures 222 have a surface normal 228 that makes an angle θ relative to a plane of the optical film. The three-dimensional structures may have flat or substantially flat sides or the sides may have a curvature. It has been found that three-dimensional geometries having the angle θ close to 45 degrees over a significant fraction of the surface area of the three-dimensional structures provide an improved on-axis brightness over other geometries. In some embodiments, the angle θ is in a range of about 35 degrees, or about 40 degrees, to about 50 degrees, or to about 55 degrees, over at least 50 percent, or over at least 60 percent, or over at least 70 percent or over at least 80 percent of the surface area of the three-dimensional structures. In the illustrated embodiment, the three-dimensional structures 222 are inverted pyramids. In some embodiments, the ridges 226 may be rounded or otherwise modified to reduce potential scratching of adjacent films or components. In some embodiments, the sides of the inverted pyramids may be rounded. In some embodiments, the three-dimensional structures 222 are three-dimensional microstructures.

Collimating reflective polarizer 210 may have any suitable thickness. In some embodiments, collimating reflective polarizer 210 may be a polymeric multilayer optical film collimating reflective polarizer, which may also be described as a collimating multilayer optical film (CMOF).

Structured layer 220 may be formed through any suitable process, including microreplication processes such as casting and curing. For example, three-dimensional structures may be formed using a microreplicated tool containing a desirable pattern or structure by casting a polymerizable resin composition onto an outer surface of a collimating reflective polarizer and curing the resin composition when it is in contact with the tool surface. Such cast and cure processes are described in U.S. Pat. No. 5,175,030 (Lu et al.) and U.S. Pat. No. 5,183,597 (Lu), for example. The resin used to form structured layer 220 may be selected for its processing capabilities, other physical properties such as durability, melt, and warp resistance, and optical properties such as index of refraction, transparency, and diffusive qualities. For example, the resin may be selected to have a refractive index that matches or is close to the refractive index in an outer layer of the collimating reflective polarizer. Structured layers of the present description may have a refractive index in a range of about 1.45 or about 1.50 to about 1.8 or about 1.9, for example. As used herein, unless specified differently, "refractive index" refers to refractive index for light having a wavelength of 589 nm (sodium D line) at 25° C. The resin may be an ultraviolet (UV) curable resin, such as an acrylate, for example.

In some embodiments structured layer 220 may be formed directly on collimating reflective polarizer 210, for example, in a cast and cure process. In other embodiments, structured layer 220 may be formed on a separate substrate and then attached to collimating reflective polarizer 210 with an adhesive. The substrate may be any suitable material, including polymeric materials such as polyethylene terephthalate (PET), polycarbonate (PC), or poly(methyl methacrylate) (PMMA). The adhesive may be any suitable adhesive, including an optically clear adhesive (OCA), a pressure sensitive adhesive (PSA), or a heat or UV-curable adhesive.

Figure 3:
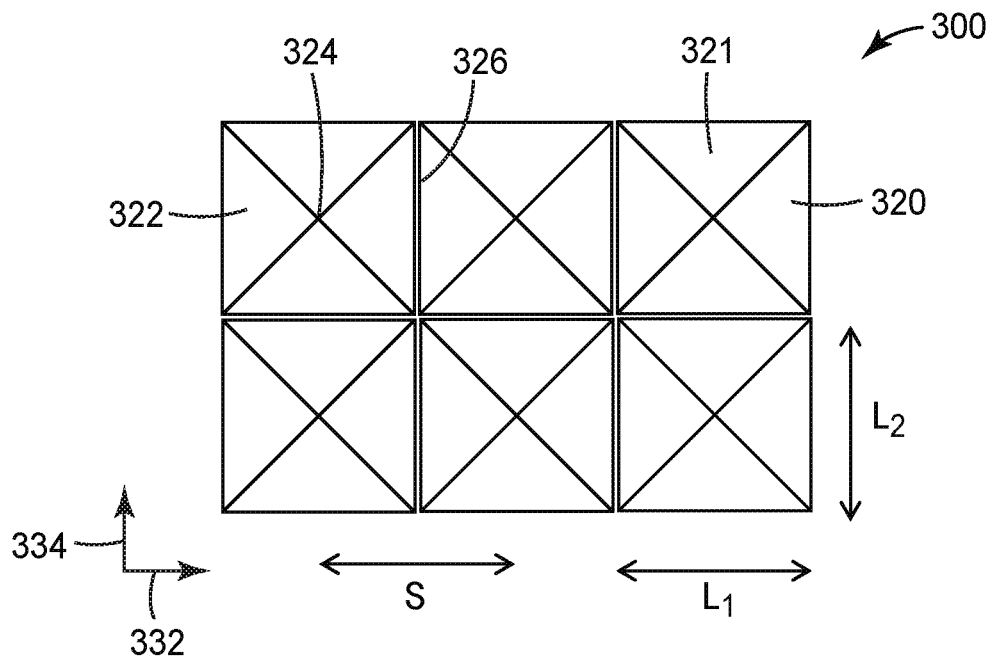
FIGS. 3-4 are top views of portions of optical films.

FIG. 3 is a top view of a portion of optical film 300 including a structured layer 320 that has an outer major surface 321 including three-dimensional structures 322 having extrema 324 and ridges 326. Three-dimensional structures 322 may be pyramids (having four sides and a base) and extrema 324 may be vertices of the pyramids, or three-dimensional structures 322 may be inverted pyramids (having four sides) and extrema 324 may be valleys of the inverted pyramids. Each side of a pyramid or inverted pyramid may have a surface normal that makes an angle of about 45 degrees (or makes an angle in the range of 40 to 50 degrees or in any of the ranges described elsewhere) relative to a plane of optical film 300. In some embodiments, the ridges 326 and/or the extrema 324 and/or edges of the prisms or inverted prisms may be rounded or otherwise modified. Ridges 326 surround the extrema 324. Three-dimensional structures 322 are arranged in a repeating pattern that repeats along a first direction 332 in the plane of the optical film 300 and along a second direction 334 in the plane of the optical film 300. Second direction 334 is orthogonal to first direction 332. The three-dimensional structures 322 have a nearest neighbor spacing of S. For arrangements of three-dimensional structures that are periodic in two directions, the nearest neighbor spacing is the smaller of the pitches (e.g., valley to valley distance) in the two directions. For arrangements of three-dimensional structures that are not periodic, an average nearest neighbor spacing can be defined as the distance from an extrema of a three-dimensional structure to an extrema of the nearest neighboring three-dimensional structure averaged over the three-dimensional structures on the structured layer. In some embodiments, the three-dimensional structures have an average nearest neighbor spacing in a range of 1 micrometer to 1 millimeter or in a range of 5 micrometers to 500 micrometers.

As used herein, "three-dimensional structures" are structures which are structured in three dimensions. Three-dimensional structures in a structured layer exhibit variation along each direction in the plane of the structured layer and exhibit variation in the direction normal to the plane of the structured layer. A cross-section of a three-dimensional structure in a plane orthogonal to a direction varies along the direction for any direction. Example three-dimensional structures include pyramids having a base and three of four sides sloping towards an apex. Other examples include inverted pyramids having three of four sides sloping towards a valley. A surface structure having the shape of an inverted pyramid, for example, is a three-dimensional structure since the surface exhibits variation in two in-plane directions and in the direction normal to the plane of the structured layer. Still other examples include "bullet" or inverted bullet geometries where the bullet shape can be describe as a surface of revolution about an axis normal to the plane of the structured layer. Linear prisms which extend along an in-plane direction are structured in only-two directions (one in-plane direction and a vertical direction) and are therefore not three-dimensional structures. Structures, such as a linear prisms, which extend in a direction and have uniform cross-sections along that direction may be referred to herein as "two-dimensional structures".

In some embodiments, the three-dimensional structures have a maximum dimension (i.e., a maximum length between two points on the three-dimensional structures) in a range of 0.5 micrometers to 5 millimeters, or in a range of 1 micrometer to 2 millimeters, or in a range of 1 micrometer to 1 millimeter, or in a range of 5 micrometers to 500 micrometers. In some embodiments, the three-dimensional structures have a first length in a first in-plane direction in a range of 1 micrometer to 1 millimeter or in a range of 5 micrometers to 500 micrometers and have a second length in a second in-plane direction orthogonal to the first in-plane direction in a range of 1 micrometer to 1 millimeter or in a range of 5 micrometers to 500 micrometers. In embodiments where the three-dimensional structures are arranged in a repeating pattern, at least one of the first in-plane direction and the second in-plane direction may be a repeat direction (e.g., a direction along a Bravais lattice vector). In some embodiments, a ratio of the first length to the second length is in a range of 0.01 or 0.1 to 10 or 100. In some embodiments, the three-dimensional structures have a maximum diameter in the plane of the ridges (e.g., a length along a diagonal of the square ridge 326 of three-dimensional structures 322, which may also be a maximum dimension of the three-dimensional structures 322) and a minimum diameter in the plane of the ridges (e.g., a length along a side of the square ridge 326 of three-dimensional structures 322). Each of the maximum and the minimum diameters may be in a range of 1 micrometer to 1 millimeter or in a range of 5 micrometers to 500 micrometers. A ratio of the maximum diameter to the minimum diameter may be in a range of 1 to 100 or 1 to 10 or 1 to 5.

For example, three-dimensional structures 322 have a first length $L_1$ in a first direction 332 in the plane of the optical film 320 and a second length $L_2$ in a second direction 334 in the plane of the optical film. The second direction 334 is orthogonal to the first direction 332 and each of directions 332 and 334 are repeat directions. In some embodiments, a ratio of the first length $L_1$ to the second length $L_2$ (i.e., $L_1/L_2$) is in a range of 0.01 or 0.1 to 10 or 100. The three-dimensional structures 322 have an average nearest neighbor spacing of S. S can be described as a pitch in the first direction 332 which is also equal to the pitch in the second direction 334 for a square lattice.

In some embodiments, the three-dimensional structures are rounded near the extrema so that that there no sharp points at the extrema. A pyramid or inverted pyramid with rounded apex or rounded valley may still be referred to as a pyramid or inverted pyramid, respectively. In some embodiments, the extrema has a radius of curvature in a range of about 0.01 or about 0.02 or about 0.03 to about 0.07 or about 0.08 or about 0.1 times the average nearest neighbor spacing of the three-dimensional structures. For example, in some embodiments, the three-dimensional structures have a valley and a ridge opposite the valley from the collimating reflective polarizer and each valley has a radius of curvature in the range of about 0.02 to about 0.08 times an average nearest neighbor spacing of the three-dimensional structures. The radius of curvature may be understood as the inverse of the absolute value of the mean curvature where the mean curvature is the arithmetic average of the principle curvatures.

In the embodiment illustrated in FIG. 3, the three-dimensional structures 322 are arranged on a square lattice. In other embodiments, the three dimensional structures may be arranged in other repeating patterns, such as on a hexagonal lattice (which may also be referred to as an equilateral triangular lattice) or other two-dimensional repeating lattices. In still other embodiments, the three dimensional structures may be arranged randomly or pseudo-randomly (e.g., arranged using a deterministic algorithm to produce an arrangement that appears random).

Figure 4:
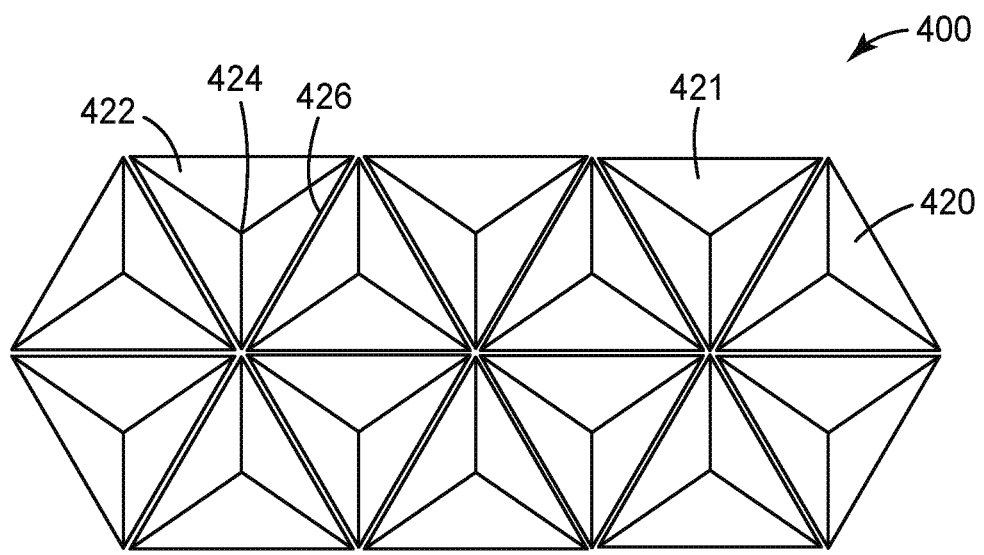

FIG. 4 is a top view of a portion of optical film 400 including a structured layer 420 having an outer major surface 421 that includes three-dimensional structures 422 having extrema 424 and ridges 426. Three-dimensional structures 422 may be pyramids (having three sides and a base) and extrema 424 may be vertices of the pyramids, or three-dimensional structures 422 may be inverted pyramids (having three sides) and extrema 424 may be valleys of the inverted pyramids. Each side of a pyramid or inverted pyramid may have a surface normal that makes angle of about 45 degrees (or makes an angle in the range of 40 to 50 degrees or in any of the ranges described elsewhere) relative to a plane of optical film 400. In some embodiments, the ridges 426 and/or the extrema 424 may be rounded or otherwise modified. Ridges 426 surround the extrema 424. The three-dimensional structures 422 are arranged on a hexagonal lattice.

Figure 5:
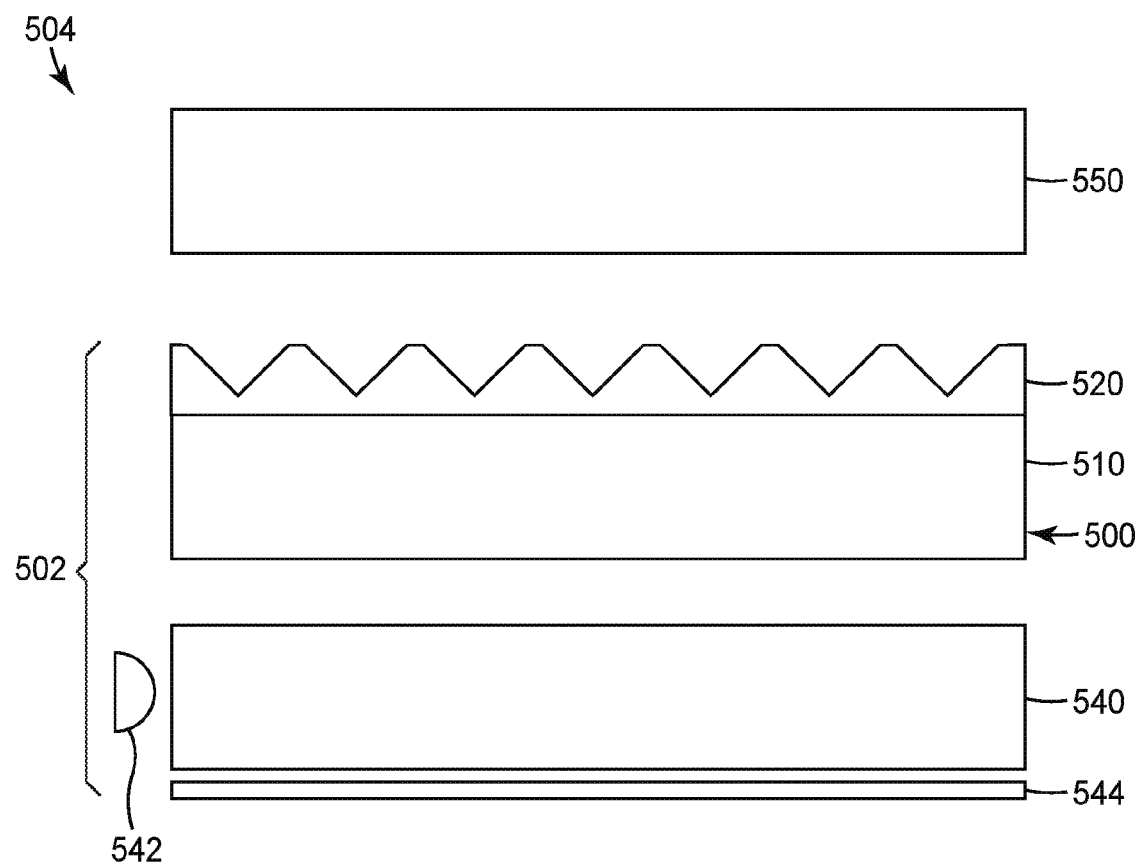
FIG. 5 is a schematic cross-sectional view of a display including a backlight system that includes an optical film.

FIG. 5 is a schematic cross-sectional view of a display 504 including backlight system 502 and display panel 550, which may be a liquid crystal display panel. Backlight system 502 includes optical film 500, which includes collimating reflective polarizer 510 and structured layer 520, light guide 540, lighting component 542, and reflector 544. Optical film 500 may be any of the optical films described herein and may correspond to optical film 200, for example. Optical film 500 is disposed proximate the light guide 540 with the structured layer 520 facing away from the light guide. When disposed in this way, the optical film 500 has been found to be effective in increasing the on-axis luminance of the display 504. Reflector 544 is disposed proximate the light guide 540 opposite the optical film 500. Display panel 550, which may be a liquid crystal display (LCD) panel, for example, is disposed proximate optical film 500 opposite light guide 540. Lighting component 542 is disposed to inject light into an end of light guide 540. Lighting component 542 may be one or may be any number of light sources, including CCFLs, LEDs, incandescent light bulbs, or any combination thereof. Light guide 540 may be constructed from any suitable material and may be of any suitable shape or size. For example, a light guide may be formed from acrylic and may be planar, tapered, or curved. The light guide 540 may include any suitable extraction features, such as, for example, dots or bars printed onto a major surface of the light guide adjacent reflector 544. The reflector 544 may be any suitable reflector. In some embodiments, reflector 544 may be a multilayer reflective film, such as Enhanced Specular Reflector (ESR), available from 3M Company, St. Paul, Minn.

In some embodiments, an air gap separates optical film 500 and the light guide 540. In other embodiments, optical film 500 is attached to the major surface of light guide 540 opposite reflector 544. Optical film 500 can be attached to light guide 540 using an optically clear adhesive, for example.

EXAMPLES

Preparation of Collimating Reflective Polarizer

A collimating multilayer optical film (CMOF) was prepared as described in Example 3 of U.S. Patent App. Pub. No. 2014/0254125 (Nevitt el al.). In particular, using the feedblock method described in U.S. Patent App. Pub. No. 2011/0272849 entitled "Feedblock for Manufacturing Multilayer Polymeric Films", filed May 6, 2011, two packets of 275 layers each of alternating low and high index polymer layers were coextruded as a cast web and then stretched in a tenter on a continuous film making line. The high index material was a 90/10 coPEN (90% naphthalate units and 10% terephthalate units). The low index material differed between packet 1 and packet 2 of the microlayers. The low index material for packet 1 was a blend of PETg (EASTAR GN071 copolyester from Eastman Chemical, Kingsport, Tenn.) and an amorphous 55/45 coPEN (55% naphthlate units and 45% terephthalate units). The blend ratio was adjusted so as to obtain an index of 1.589. The low index material for packet 2 was TRITAN FX150 copolyester from Eastman Chemical (Kingsport, Tenn.) and had a measured index of 1.554. All indices were measured at 633 nm.

Figure 6:
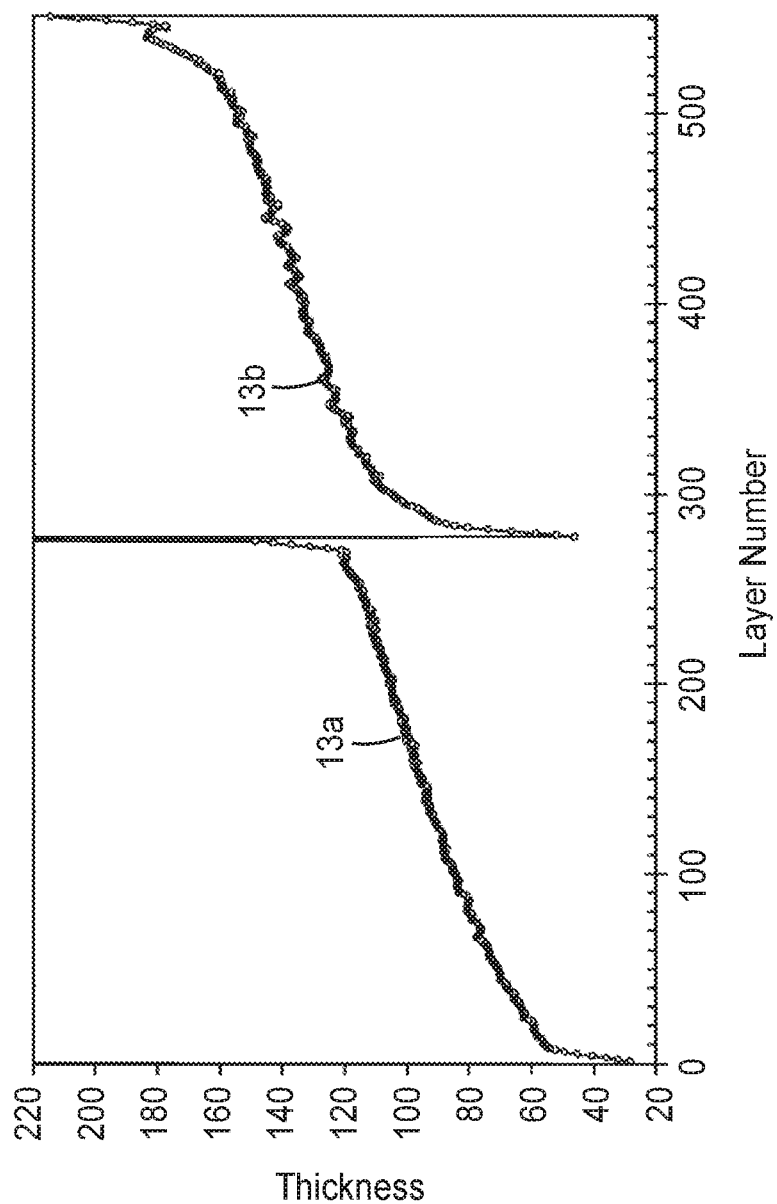
FIG. 6 is a graph showing the layer thickness profile of a collimating reflecting polarizer.

The layer thickness values of the CMOF film were measured using Atomic Force Microscopy (AFM), and the layer thickness profiles 13a and 13b are shown in FIG. 6 for packets 1 and 2 respectively.

The ratio of pass axis light transmitted at 60 degrees to the transmission value at 0 degrees is a good indication of the collimating potential of the film when used with a recycling backlight. The transmission spectra for p-polarized incident light and s-polarized were determined for incidence angles of 0 and 60 degrees. The average transmission values for each measurement (% T) were estimated by averaging the transmission values of each spectrum between 420 nm and 680 nm. No photopic weighting was used, although this could be applied if desired. The average % T values for the CMOF film were as follows: for p-pol: 75% at 0 deg, dropping to 46% at 60 deg, and for s-pol: 75% at 0 deg dropping to 36% at 60 deg. The ratios of the values of Tpass60/Tpassnormal for p-pol and s-pol light were 0.62 and 0.48 respectively.

Determination of Axial Luminance

A backlight with and without various optical film disposed over the backlight was modeled using standard ray tracing techniques. The on-axis luminance was determined with and without an optical film disposed over the backlight. In cases where the optical film includes refractive structures, the optical film was disposed with the refractive structures facing away from the backlight. The normalized axial luminance associated with an optical film (i.e., the gain of the optical film) was determined as the on-axis luminance with the optical film in place divided by the on-axis luminance without the optical film in place times 100 percent.

Examples 1-3 and Comparative Examples C-1-C-8

Figure 7A:
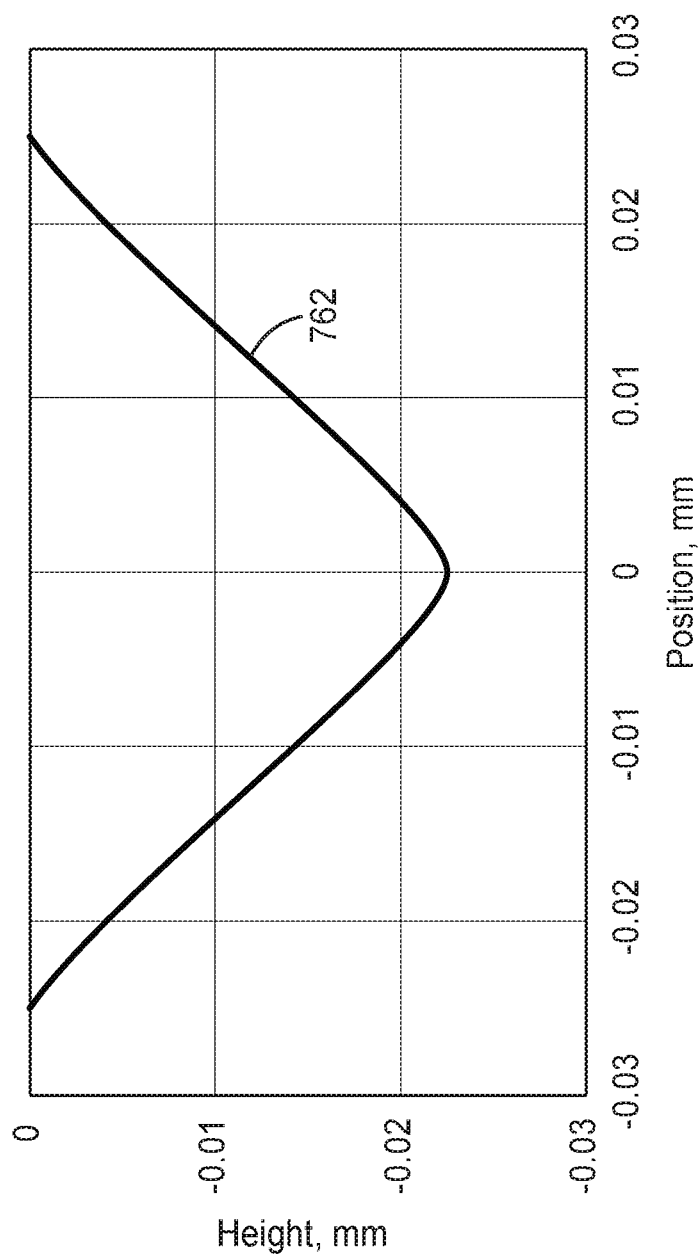
FIG. 7A is a graph of a cross-sectional profile of a three-dimensional structure.
Figure 7B:
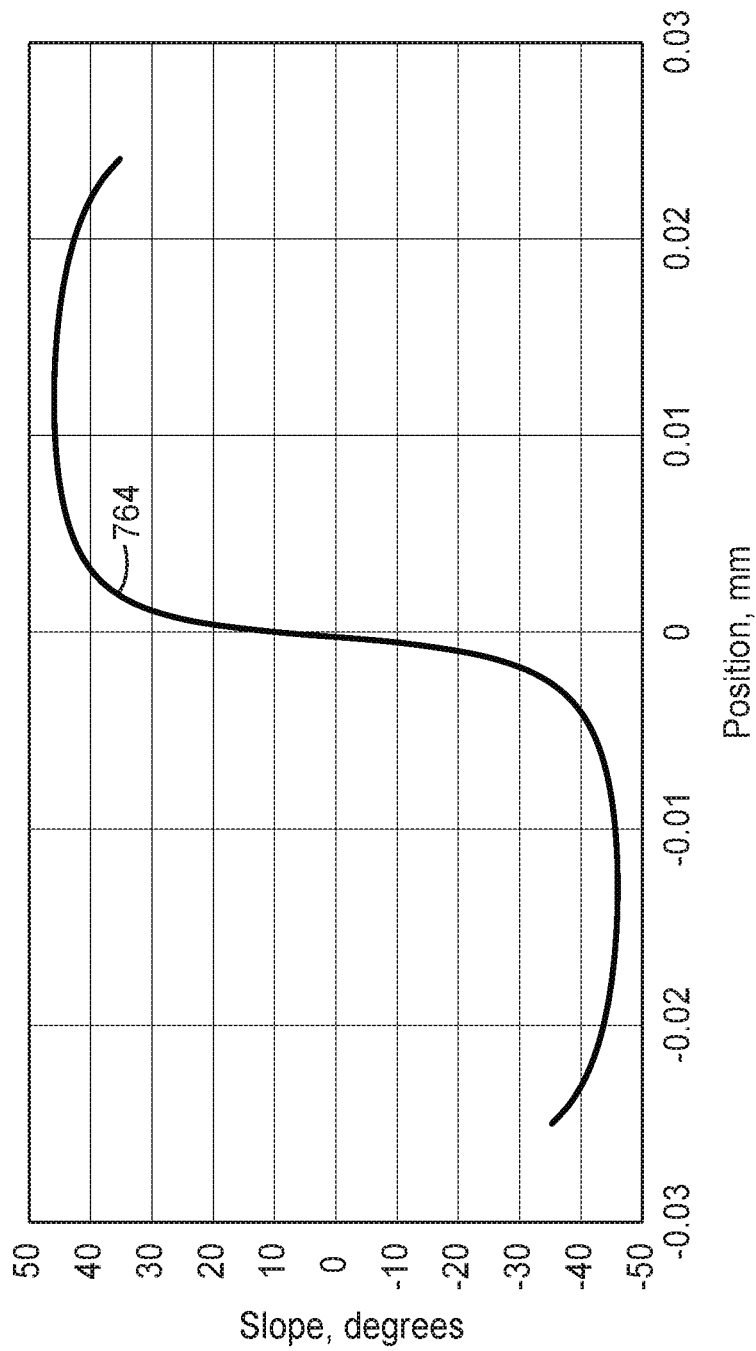
FIG. 7B is a graph of the slope of the cross-sectional profile of FIG. 7A.

An optical film having a structured layer similar to those shown in FIGS. 2-3 disposed on a CMOF similar to that described in "Preparation of Collimating Reflective Polarizer" was modeled in a backlight system as described under "Determination of Axial Luminance". The structured layer included three-dimensional microstructures arranged on a square lattice having a pitch of about 50 micrometers. The three-dimensional structures had either approximately inverted pyramid shapes or approximately pyramid shapes. FIG. 7A shows a graph of the cross-sectional profile 762 of a three-dimensional structure having an approximately inverted pyramid shape and FIG. 7B shows a graph of the slope 764 of the cross-sectional profile 762 of FIG. 7A. The three-dimensional structures had a surface normal having an angle relative to a plane of the optical film in a range of 40 degrees to 50 degrees (i.e., a slope between 40 and 50 degrees or between −50 and −40 degrees) over about 77 percent of the surface area of the three-dimensional structures.

The CMOF film was modeled as two packets, each having a high index material of 90/10 coPEN (90% naphthalate units and 10% teraphthalate units) and each having a low index material of 55/45 coPEN (55% naphthlate units and 45% terephthalate units). The refractive indices for the 90/10 coPEN at 633 nm were $n_x=1.820$, $n_y=1.617$, and $n_z=1.523$, and the refractive indices for the 55/45 coPEN at 633 nm were $n_x=1.625$, $n_y=1.625$, and $n_z=1.625$. The layer profile was similar to that shown in FIG. 6. Optical modeling showed that the CMOF film had a Tpass60/Tpassnormal for p-pol light of 0.655.

Simulations were performed for the CMOF film alone, for the structured layer alone and for CMOF with the structured layer disposed on the CMOF with the structures facing away from the CMOF. Various refractive indices for the structured layer were modeled. For comparison, a conventional reflective polarizer with one or two orthogonally crossed BEF films (linear (2-D) prism films) was also modeled. The conventional reflective polarizer was modeled to give transmission and reflection characteristics of APF (a reflective polarizer commercially available from 3M Company, St. Paul, Minn.) and the BEF films were modeled as linear triangular prisms having a prism angle of 90 degrees and having a pitch of 50 micrometers. BEF films were positioned so that the prisms extended horizontally, vertically or both (in the case of two crossed films) relative to the backlight where the horizontal direction refers to the longer side of the approximately rectangular backlight.

The results, which are reported in the table below, show that CMOF with an appropriately structured layer gives a normalized axial luminance comparable to or better than conventional film stacks while CMOF alone does not. Comparing Examples 2 and 3 with Comparative Example C-4, it can be seen that a single optical film of the present description (a CMOF with a structured layer disposed on a major surface of the CMOF) can give better normalized axial luminance (gain) than a three layer stack of a conventional reflective polarizer and two crossed BEF films. Comparing Example 1 with Comparative Examples C-4 and C-5 and comparing Examples 2 and 3 with Comparative Examples C-6 and C-7 show that using a structured layer having two-dimensional structures is not as effective as using a structured layer having three-dimensional structures.

| Example | Description | Refractive Index of Structured Layer | Shape | Normalized Axial Luminance (%) |
|---|---|---|---|---|
| C-1 | CMOF only | N/A | N/A | 117 |
| C-2 | Structured layer only | 1.50 | Pyramid | 152 |
| C-3 | Structured layer only | 1.58 | Pyramid | 172 |
| 1 | CMOF with structured layer | 1.50 | Pyramid | 173 |
| 2 | CMOF with structured layer | 1.58 | Pyramid | 193 |
| 3 | CMOF with structured layer | 1.58 | Inverted Pyramid | 199 |
| C-4 | Conventional reflective polarizer + crossed linear prism films | 1.58 | 2-D Prisms | 188 |
| C-5 | CMOF + Horizontal BEF | 1.50 | 2-D Prisms | 143 |
| C-6 | CMOF + Vertical BEF | 1.50 | 2-D Prisms | 145 |
| C-7 | CMOF + Horizontal BEF | 1.58 | 2-D Prisms | 148 |
| C-8 | CMOF + Vertical BEF | 1.58 | 2-D Prisms | 142 |

The following is a list of exemplary embodiments of the present description.

Embodiment 1 is an optical film comprising:
a collimating reflective polarizer,
a structured layer disposed on a major surface of the collimating reflective polarizer,
wherein the structured layer comprises a plurality of three-dimensional structures on an outer major surface of the structured layer facing away from the collimating reflective polarizer, the three-dimensional structures having a surface normal having an angle relative to a plane of the optical film, wherein the angle is in a range of about 35 degrees to about 55 degrees over at least 50 percent of a surface area of the three-dimensional structures.

Embodiment 2 is the optical film of embodiment 1, wherein a maximum dimension of the three-dimensional structures is in a range of about 1 micrometer to about 2 millimeters.

Embodiment 3 is the optical film of embodiment 1, wherein the three-dimensional structures are arranged in a repeating pattern.

Embodiment 4 is the optical film of embodiment 3, wherein the three-dimensional structures are arranged on a hexagonal lattice or on a square lattice.

Embodiment 5 is the optical film of embodiment 1, wherein the three-dimensional structures are arranged randomly or pseudo-randomly.

Embodiment 6 is the optical film of embodiment 1, wherein each of the three-dimensional structures have a valley and a ridge opposite the valley from the collimating reflective polarizer, the ridge surrounding the valley.

Embodiment 7 is the optical film of embodiment 6, wherein each valley has a radius of curvature in the range of about 0.02 to about 0.08 times an average nearest neighbor spacing of the three-dimensional structures.

Embodiment 8 is the optical film of embodiment 1, wherein the angle is in a range of about 40 degrees to about 50 degrees over at least 60 percent of the surface area of the three-dimensional structures.

Embodiment 9 is the optical film of embodiment 1, wherein the collimating reflective polarizer has a transmission along a pass axis at normal incidence of Tpassnormal for p-pol light and a transmission along the pass axis at 60 degrees incidence of Tpass60 for p-pol light, and a ratio of Tpass60 to Tpassnormal is less than 0.75.

Embodiment 10 is a backlight system comprising:
a light guide,
the optical film of embodiment 1 disposed proximate the light guide, the structured layer facing away from the light guide.

Embodiment 11 is the backlight system of embodiment 10, further comprising a reflector disposed proximate the light guide opposite the optical film.

Embodiment 12 is the backlight system of embodiment 10, wherein the optical film is attached to a major surface of the light guide.

Embodiment 13 is the backlight system of embodiment 10, wherein an air gap separates the optical film and the light guide.

Embodiment 14 is the backlight system of embodiment 10, wherein a maximum dimension of the three-dimensional structures is in a range of about 1 micrometer to about 2 millimeters.

Embodiment 15 is the backlight system of embodiment 10, wherein the three-dimensional structures are arranged in a repeating pattern.

Embodiment 16 is the backlight system of embodiment 15, wherein the three-dimensional structures are arranged on a hexagonal lattice or on a square lattice.

Embodiment 17 is the backlight system of embodiment 10, wherein the three-dimensional structures are arranged randomly or pseudo-randomly.

Embodiment 18 is the backlight system of embodiment 10, wherein each of the three-dimensional structures have a valley and a ridge opposite the valley from the collimating reflective polarizer, the ridge surrounding the valley.

Embodiment 19 is the backlight system of embodiment 18, wherein each valley has a radius of curvature in the range of about 0.02 to about 0.08 times an average nearest neighbor spacing of the three-dimensional structures.

Embodiment 20 is the backlight system of embodiment 10, wherein the angle is in a range of about 40 degrees to about 50 degrees over at least 60 percent of the surface area of the three-dimensional structures.

Embodiment 21 is the backlight system of embodiment 10, wherein the collimating reflective polarizer has a transmission along a pass axis at normal incidence of Tpassnormal for p-pol light and a transmission along the pass axis at 60 degrees incidence of Tpass60 for p-pol light, and a ratio of Tpass60 to Tpassnormal is less than 0.75.

Embodiment 22 is a display comprising the backlight system of any of embodiments 10 to 21.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical film comprising:
   a collimating reflective polarizer,
   a structured layer disposed on a major surface of the collimating reflective polarizer,
   wherein the structured layer comprises a plurality of three-dimensional structures on an outer major surface of the structured layer facing away from the collimating reflective polarizer, the three-dimensional structures having a surface normal having an angle relative to a plane of the optical film, wherein the angle is in a range of about 35 degrees to about 55 degrees over at least 50 percent of a surface area of the three-dimensional structures, and wherein each of the three-dimensional structures has a valley and a ridge opposite the valley from the collimating reflective polarizer, the ridge surrounding the valley.

2. The optical film of claim 1, wherein a maximum dimension of the three-dimensional structures is in a range of about 1 micrometer to about 2 millimeters.

3. The optical film of claim 1, wherein the three-dimensional structures are arranged in a repeating pattern.

4. The optical film of claim 3, wherein the three-dimensional structures are arranged on a hexagonal lattice or on a square lattice.

5. The optical film of claim 1, wherein the three-dimensional structures are arranged randomly or pseudo-randomly.

6. The optical film of claim 1, wherein each valley has a radius of curvature in the range of about 0.02 to about 0.08 times an average nearest neighbor spacing of the three-dimensional structures.

7. The optical film of claim 1, wherein the angle is in a range of about 40 degrees to about 50 degrees over at least 60 percent of the surface area of the three-dimensional structures.

8. The optical film of claim 1, wherein the collimating reflective polarizer has a transmission along a pass axis at normal incidence of Tpassnormal for p-pol light and a transmission along the pass axis at 60 degrees incidence of Tpass60 for p-pol light, and a ratio of Tpass60 to Tpassnormal is less than 0.75.

9. A backlight system comprising:
   a light guide,
   the optical film of claim 1 disposed proximate the light guide, the structured layer facing away from the light guide.

10. The backlight system of claim 9, further comprising a reflector disposed proximate the light guide opposite the optical film.

11. The backlight system of claim 9, wherein the optical film is attached to a major surface of the light guide.

12. The backlight system of claim 9, wherein an air gap separates the optical film and the light guide.

13. The backlight system of claim 9, wherein each valley has a radius of curvature in the range of about 0.02 to about 0.08 times an average nearest neighbor spacing of the three-dimensional structures.

14. A display comprising the backlight system of claim 9.

15. The backlight system of claim 9, wherein the collimating reflective polarizer has a transmission along a pass axis at normal incidence of Tpassnormal for p-pol light and a transmission along the pass axis at 60 degrees incidence of Tpass60 for p-pol light, and a ratio of Tpass60 to Tpassnormal is less than 0.75.

16. The backlight system of claim 9, wherein a maximum dimension of the three-dimensional structures is in a range of about 1 micrometer to about 2 millimeters.

17. The backlight system of claim 9, wherein each valley has a radius of curvature in the range of about 0.02 to about 0.08 times an average nearest neighbor spacing of the three-dimensional structures.

18. A display comprising the backlight system of claim 17.

19. An optical film comprising:
   a collimating reflective polarizer,
   a structured layer disposed on a major surface of the collimating reflective polarizer,
   wherein the structured layer comprises a plurality of three-dimensional structures on an outer major surface of the structured layer facing away from the collimating reflective polarizer, the three-dimensional structures having a surface normal having an angle relative to a plane of the optical film, wherein the angle is in a range of about 35 degrees to about 55 degrees over at least 50 percent of a surface area of the three-dimensional structures, wherein the collimating reflective polarizer has a transmission along a pass axis at normal incidence of Tpassnormal for p-pol light and a transmission along the pass axis at 60 degrees incidence of Tpass60 for p-pol light, a ratio of Tpass60 to Tpassnormal being less than 0.75.

* * * * *